(12) United States Patent
Mentillo

(10) Patent No.: US 12,484,463 B2
(45) Date of Patent: Dec. 2, 2025

(54) AERATOR ATTACHMENT

(71) Applicant: Jeremy R Mentillo, Poughkeepsie, NY (US)

(72) Inventor: Jeremy R Mentillo, Poughkeepsie, NY (US)

( * ) Notice: Subject to any disclaimer, the term of this patent is extended or adjusted under 35 U.S.C. 154(b) by 651 days.

(21) Appl. No.: 17/181,118

(22) Filed: Feb. 22, 2021

(65) Prior Publication Data

US 2022/0264782 A1    Aug. 25, 2022

(51) Int. Cl.
  *A01B 45/02*    (2006.01)
  *A01D 43/12*    (2006.01)

(52) U.S. Cl.
  CPC .............. *A01B 45/02* (2013.01); *A01D 43/12* (2013.01)

(58) Field of Classification Search
  CPC .... A01B 45/02; A01D 43/12; A01D 2101/00; B60B 15/02; B60B 15/18; B60C 27/04; B60C 27/06; B60C 27/062; B60C 27/066
  USPC ...................................... 172/21, 22
  See application file for complete search history.

(56) References Cited

U.S. PATENT DOCUMENTS

| | | | | |
|---|---|---|---|---|
| 670,924 | A * | 4/1901 | Ames | B60B 15/02 152/182 |
| 1,367,943 | A * | 2/1921 | Brewer | B60B 15/025 301/40.1 |
| 1,382,067 | A * | 6/1921 | De Hymel | B60C 27/18 301/40.1 |
| 1,419,533 | A * | 6/1922 | Ashby | B60B 15/02 301/40.1 |
| 1,502,407 | A * | 7/1924 | Smith | B60B 15/02 301/44.1 |
| 1,898,214 | A * | 2/1933 | Richards | A01B 45/02 172/554 |
| 1,965,510 | A * | 7/1934 | Porter | A01B 45/02 172/350 |
| 2,136,975 | A * | 11/1938 | Keeten | B60B 15/26 301/40.5 |
| 2,440,417 | A * | 4/1948 | Singer | B60B 15/18 305/19 |
| 4,899,828 | A * | 2/1990 | Harris | A01B 45/02 172/21 |
| 5,906,090 | A | 5/1999 | Knudsen | |

(Continued)

OTHER PUBLICATIONS

Mow-Aerator MA2008 Riding Lawn Mower Aerator Tire Spikes, Pack, pp. 1-8, Found: https://www.amazon.com/mow-aerator-ma2008-riding-aerator-spikes/dp.

*Primary Examiner* — Christopher J Sebesta
*Assistant Examiner* — Audrey L Lusk
(74) *Attorney, Agent, or Firm* — Saile Ackerman LLC; Stephen B. Ackerman; Rosemary L.S. Pike

(57) ABSTRACT

A strap-on aerator wheel comprises two or more curved pieces having metal spikes protruding outwardly from an outside surface, a first strap end fixed to a first end of a first curved piece and a second strap end fixed to a second end of a last curved piece, a linking mechanism joining each second end of a curved piece to a first end of a next curved piece not already fixed to a first or second strap end wherein when the first and second strap ends are joined, the two or more curved pieces form a circular shape and wherein each linking mechanism is configured to be adjusted to conform to the diameter of the wheel wherein the circular shape is held onto the wheel and wherein the metal spikes are configured to aerate a lawn as the wheel is moved over the lawn.

20 Claims, 4 Drawing Sheets

(56) References Cited

U.S. PATENT DOCUMENTS

| | | | | |
|---|---|---|---|---|
| 5,934,055 A | * | 8/1999 | Steele | A01D 42/04 |
| | | | | 56/16.7 |
| 6,708,746 B2 | * | 3/2004 | Wilkinson | B60C 27/02 |
| | | | | 152/217 |
| 10,106,000 B2 | * | 10/2018 | Curry | B60C 27/20 |
| 2008/0257572 A1 | | 10/2008 | Bowman | |
| 2011/0290511 A1 | | 12/2011 | Nahass | |
| 2012/0006571 A1 | | 1/2012 | Dart | |
| 2015/0053322 A1 | * | 2/2015 | Curry | B60C 27/0276 |
| | | | | 152/221 |
| 2019/0045699 A1 | | 2/2019 | Moreno | |

* cited by examiner

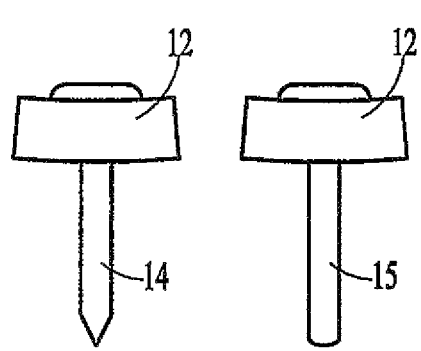
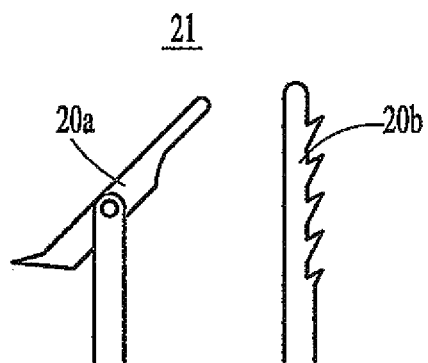
Figure 2A          Figure 2B
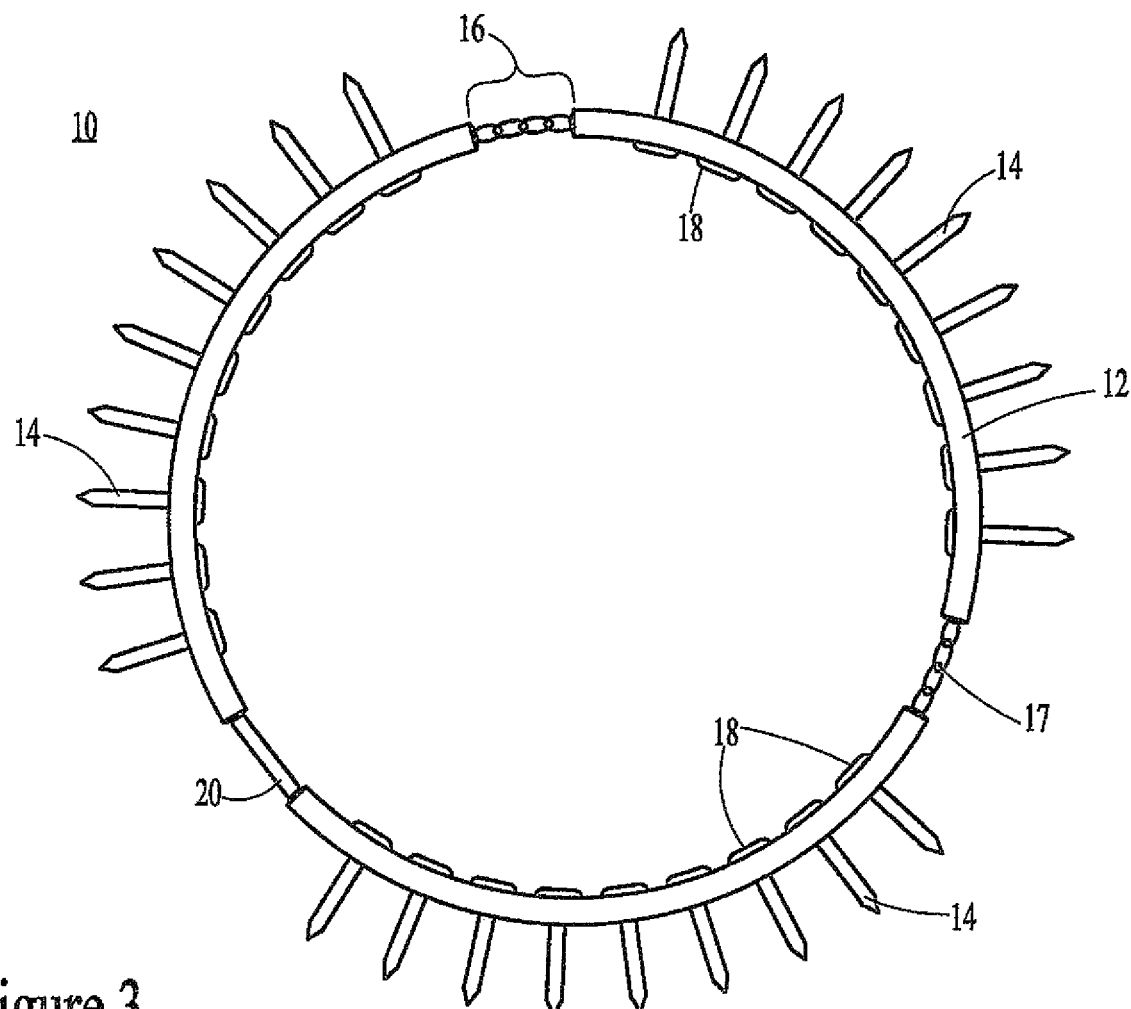
Figure 3

AERATOR ATTACHMENT

TECHNICAL FIELD

This application relates to the general field of lawn aerators, and more particularly, to a lawn aerator that can be attached to any lawn mower or other wheeled vehicle.

BACKGROUND

Aeration can be an extremely vital element to a healthy lawn. Aeration involves perforating the soil with small holes to allow air, water, and nutrients to penetrate grass roots. Aeration helps the roots to grow deeply and produce a stronger, healthier, more vigorous lawn. Aerating the lawn will help alleviate soil compaction and break up layering. Compacted soils have too many solid particles in a certain volume or space, which prevents proper circulation of air, water, and nutrients within the soil which can starve the roots from the essential elements.

Currently, there are two main types of aerating tools that exist: a spike aerator and a plug aerator. The spike aerator simply pokes holes into the ground, while plug aerators remove a core or plug of soil from the lawn.

In order to aerate the lawn, one would need to rent or purchase an aeration machine or hire a lawn or landscaping professional. In order to rent an aeration machine, one would need to transport it to and from the rental location and the location for performing the aeration. This can create the issues of also needing or having to own or rent a truck or trailer in order to transport it, which can be costly. To purchase an aeration machine can cost thousands of dollars. These machines tend to be large and heavy as well. Using these aeration machines requires applying physical labor by pushing or pulling the machine. Hiring a landscaper to aerate the lawn can also be expensive. Furthermore, there is a product that straps over a pair of shoes and has multiple spikes on the bottom intended to aerate while walking. While using these shoes, we have found that after each step they loosened up to the point where they were almost failing off completely. The shoes also require a lot of physical effort, by pushing one's body weight down so that they will penetrate and then pulling them out from the ground, which in turn causes them to loosen up each step. The more a person weighs, the more the spikes penetrate, causing extra effort to pull them out of the ground. The less a person weighs, the more effort is needed to penetrate the spikes into the ground and the same effort is required to pull them out of the ground.

Several US patents show aerating devices that can be attached to lawn mowers, including U.S. Pat. No. 5,934,055 (Steele) and US Patent Applications 2008/0257572 (Bowman), 2012/0006571 (Dart), and 2011/0290511 (Nahass). U.S. Pat. No. 5,906,090 (Knudsen) and US Patent Application 2019/0045699 (Moreno) show other aerating devices. All are different from the present disclosure.

SUMMARY

It is an object of the present disclosure to provide an aerating attachment that will fit onto the wheel of a lawn mower or other wheeled vehicle.

It is a further object of the present disclosure to provide an aerating attachment that will fit onto the wheel of a lawn mower so that the lawn can be mowed and aerated simultaneously.

Another object of the present disclosure is to provide a replacement aerating wheel for a lawn mower.

In accordance with the objectives of the present disclosure, an aerator attachment configured to fit over a wheel is achieved. The aerator attachment comprises two or more curved pieces having metal spikes protruding outwardly from an outside surface thereof, a first strap end fixed to a first end of a first curved piece and a second strap end fixed to a second end of a last curved piece, a linking mechanism joining each second end of a curved piece to a first end of a next curved piece not already fixed to a first or second strap end wherein when the first strap end is joined to the second strap end, the two or more curved pieces form a circular shape and wherein each linking mechanism is configured to be adjusted to conform to the diameter of the wheel wherein the circular shape is held onto the wheel and wherein the metal spikes are configured to aerate a lawn as the wheel is moved over the lawn.

Also in accordance with the objectives of the present disclosure a replacement aerator wheel is achieved, comprising an aerator wheel having metal spikes protruding from an outside surface of the aerator wheel and a plate on a first outside side surface of the aerator wheel having a hole centered therein and a hollow from a second outside side surface to the plate wherein the aerator wheel is configured to replace a wheel on a vehicle whereby connection of the aerator wheel to the vehicle is made through the hole with access in the hollow and wherein the metal spikes are configured to aerate a lawn as the wheel is moved over the lawn.

Also in accordance with the objectives of the present disclosure, an aerator attachment configured to fit over a wheel is achieved, comprising a flexible piece having spikes protruding outwardly from an outside surface thereof. A first strap end is fixed to a first end of the flexible piece and a second strap end is fixed to a second end of the flexible piece wherein when the first strap end is joined to the second strap end, the flexible piece forms a circular shape conformed to a diameter of the wheel wherein the circular shape is held onto the wheel and wherein the spikes are configured to aerate a lawn as the wheel is moved over the lawn.

BRIEF DESCRIPTION OF THE DRAWINGS

In the accompanying drawings forming a material part of this description, there is shown:

FIG. 2A illustrates a side view of alternative spike types in the first and second preferred embodiments of the present disclosure.

FIG. 2B illustrates a side view of an example clasp in the first embodiment of the present disclosure.

FIG. 3 illustrates a side view of the first preferred embodiment of the present disclosure.

DETAILED DESCRIPTION

The present disclosure describes an aerator attachment that can be strapped on over the wheels of a lawn mower and aerate the lawn while it is being mowed. The attachment can be used on any stand-up mower, push mower, or riding mower or other device such as a fertilizer. The aerator attachment will make holes in the soil to allow oxygen to enter. The attachment can be made in one size for stand-up push mowers and in another size for riding mowers. Each attachment will be adjustable to the size of the particular tires on the mower. The aerator attachment can be strapped onto and used on an automatic push mower, manual push mower, riding lawn mower, push fertilizer, four-wheeler, lawn tractor, remote controlled lawn mower, and any other device having wheels.

The aerator of the present disclosure is an easy alternative to having to hire and pay a professional or rent or purchase a costly and heavy aeration machine. The aerator is an affordable, easy, do-it-yourself attachment that eliminates the above issues because it is simple to carry and transport and allows the lawn mower to do the work of aeration. By simply attaching the aerator to the lawn mower wheels or changing the current wheels and replacing them with the aerator replacement wheels, a user can cut the grass and aerate simultaneously with no extra effort.

Figure 1A:
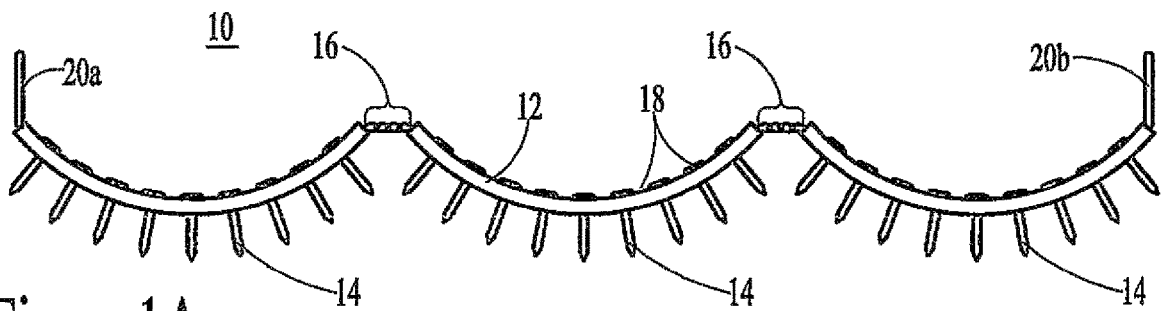
FIGS. 1A-1C illustrate a side view of alternatives in a first preferred embodiment of the present disclosure.
Figure 1B:
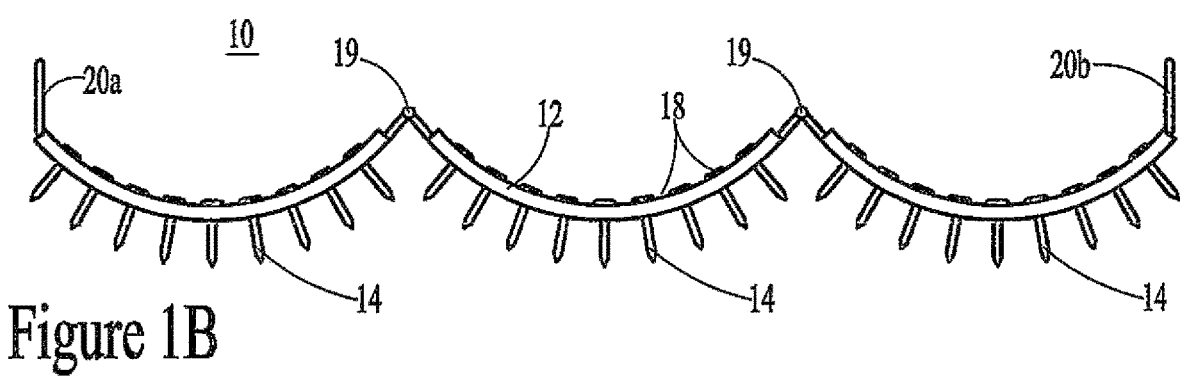
Figure 1C:
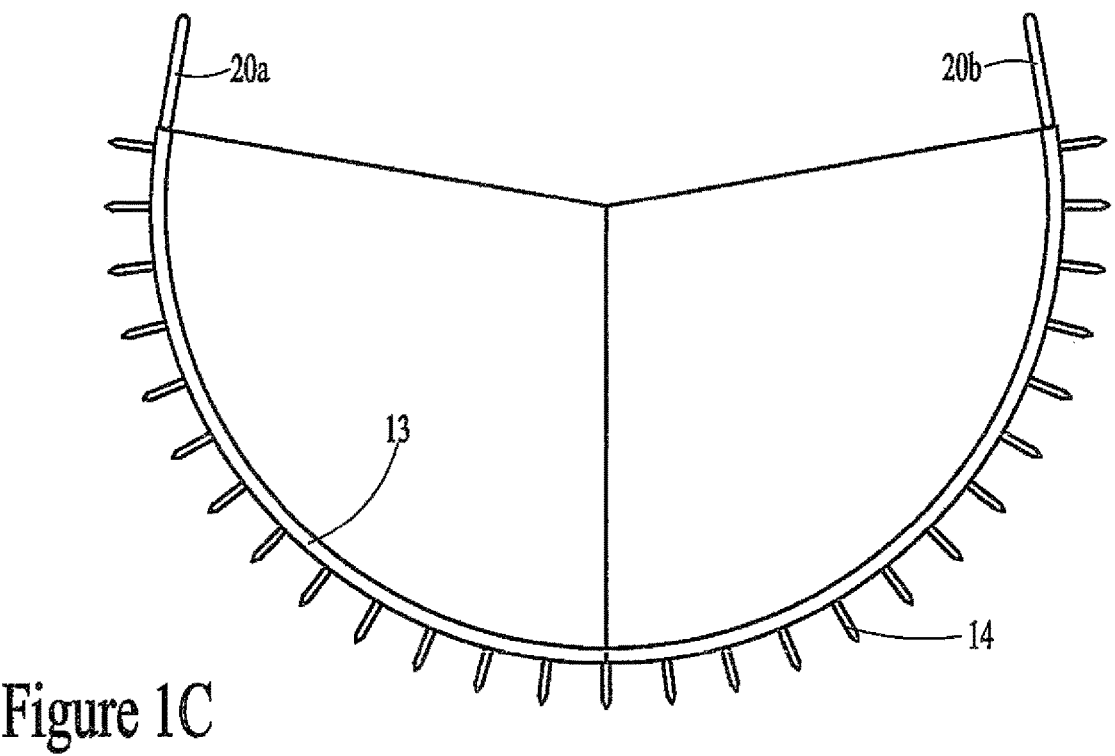

The aerator is adjustable and can be placed on any lawn mower wheel(s) or other wheels, such as push fertilizers, riding lawn mowers, four wheelers, etc. by placing it around the wheel and strapping it into place. FIGS. 1A-1C illustrate the aerator attachment in the first embodiment of the present disclosure. The attachment 10 includes multiple pieces 12 that are curved to the shape of a portion of a tire. Each piece 12 may preferably comprise plastic and may be approximately ⅛ to ½ inch thick. There may be three pieces 12, as shown in FIG. 1A and FIG. 1B. The curved pieces 12 may be of the same or different lengths and there may be one piece or two, three, or more pieces that fit together to make a circular shape. On an outside surface of each of the curved pieces are metal or plastic spikes 14 protruding outwardly from the curved pieces. For example, the aerating spikes 14 may be 1 to 3 inches long and may be spaced apart between about ½ to 3 inches. As illustrated in FIG. 2A, the spikes may be removable or non-removable and may be spiked 14 (to poke holes into the ground), or plugged 15 (to remove a core or plug of soil from the lawn).

One end of a strap 20A is fixed onto one end of a first curved piece and a second end of a strap 20B is fixed onto an end of a last curved piece. These two strap ends 20A and 20B will be joined to form the curved pieces into a circle. The second end of the first curved piece and the first end of the last curved piece are connected by a linking mechanism 16 to each other if there are two curved pieces, or to the next curved piece in line if there are more than two curved pieces 12. The linking mechanism 16 is adjustable to fit tires of different sizes. For example, as shown in FIG. 1A, the mechanism 16 may comprise links 17 (shown in FIG. 3). By removing or adding links, the diameter of the circle created when the pieces are combined may be decreased or increased, respectively, so that the attachment fits correctly onto different sized wheels.

As shown in FIG. 1B, the linking mechanism may be hinges 19. In a third alternative, shown in FIG. 1C, there is one flexible piece 13, that may be plastic. Each of the curved pieces 12 or the flexible piece 13 will have aerator spikes 14 sticking out so that they may protrude into the soil while the lawn mower is in motion. Once the mechanism 16 is correctly adjusted, the aerator attachment 10 will be fastened by pulling the strap and connecting one end of the strap 20a to the other end 20b so that it fits tightly onto the wheel and doesn't slip. The strap will be fastened by an adjustable clasp 21, like on a ski boot, for example. FIG. 2B illustrates an example clasp 21 having two ends 20a and 20b. The strap will allow the aerator attachment to tighten and connect with the tread all the way around the tire so that it does not loosen or come off during use.

Figure 4A:
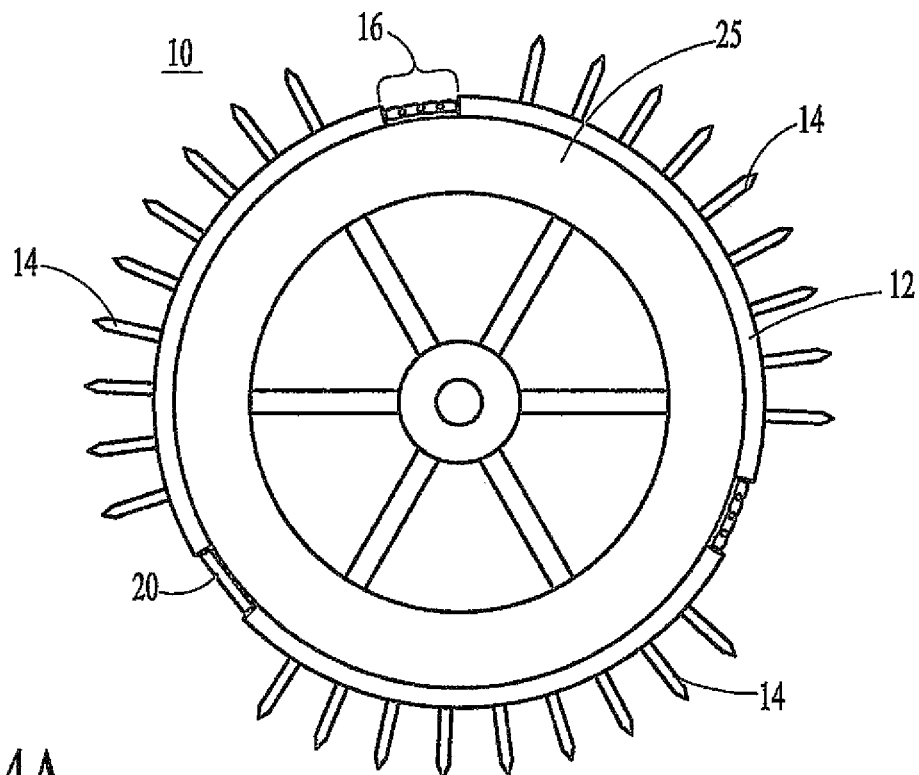
FIGS. 4A and 4B illustrate side views of the first preferred embodiment of the present disclosure installed on a lawn mower tire.
Figure 4B:
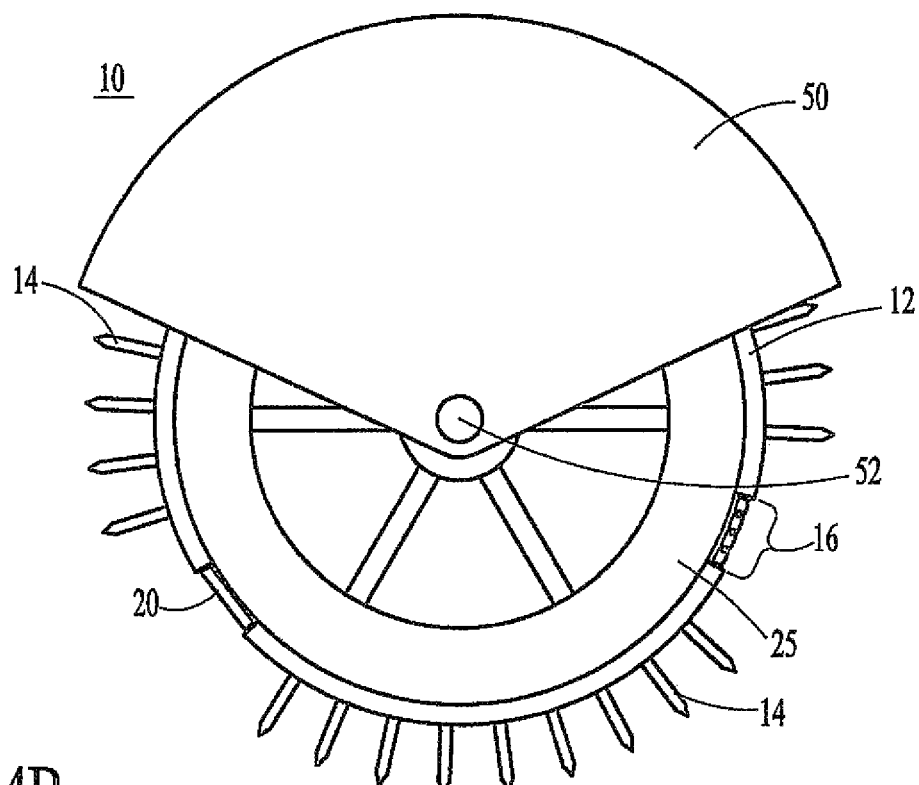

FIG. 3 illustrates the aerator attachment after it has been fastened into its circular orientation. The inside surface of each of the curved pieces 12 may have small "studs" or protrusions 18 to allow the curved pieces 12 to fit snugly between the treads of the wheel(s) and prevent slippage. FIG. 4A illustrates the aerator attachment 10 fitted over a tire 25. In FIG. 4B, an optional guard attachment 50 has been fitted over the upper portion of the wheel. The guard attachment 50 blocks access to the spikes to protect people from injury while allowing free movement of the tire and attached spikes. The guard attachment is connected at collar 52 to the axle of the wheel so that the guard attachment does not rotate with the wheel, but always remains covering the upper portion of the wheel as the tire rotates.

Figure 5:
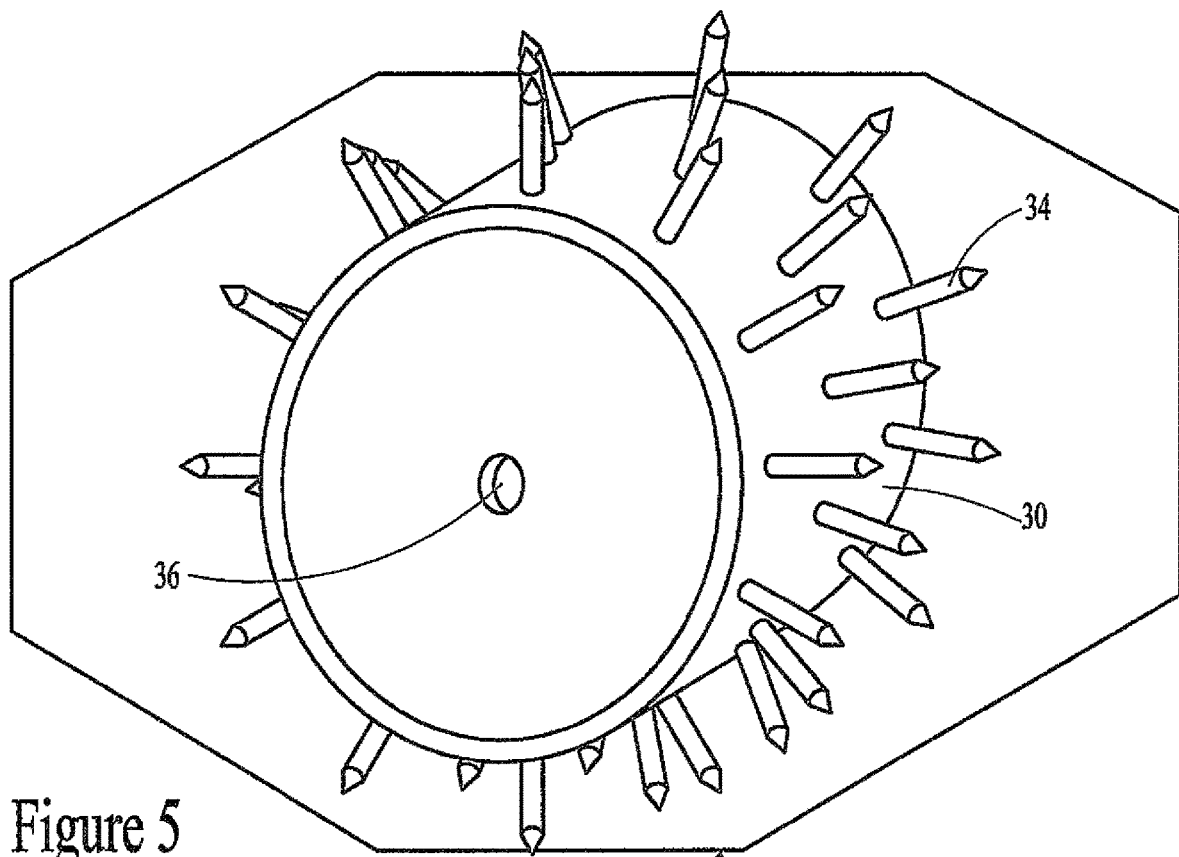
FIGS. 5 and 6 illustrate first and second oblique views of the second preferred embodiment of the present disclosure.
Figure 6:
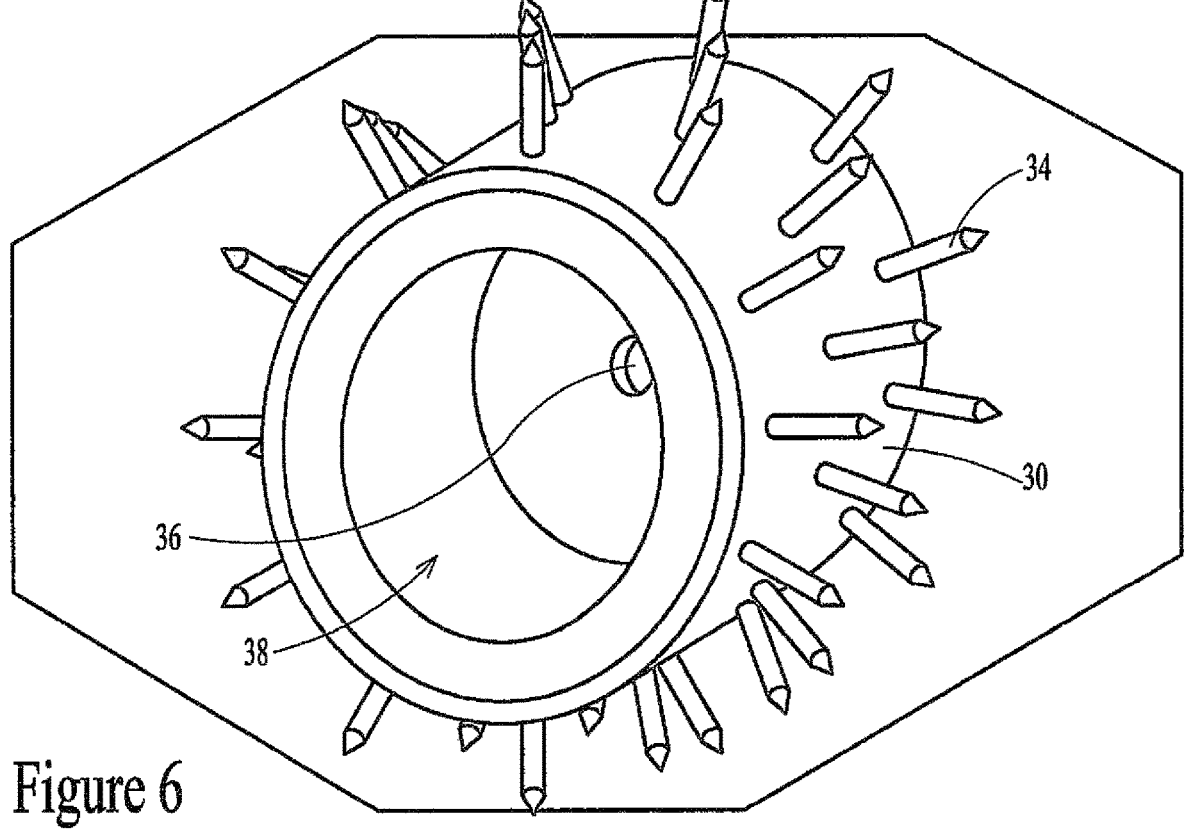

The second preferred embodiment of the present disclosure is an aerator replacement wheel, illustrated in FIGS. 5-6. The replacement wheel 30 is easily installed by removing the existing wheel from the lawn mower and replacing it with the aerator replacement wheel. One or more wheels on the mower may be replaced with aerator replacement wheels. The replacement wheel does not have to be the same exact size as the existing wheel so long as the replacement wheel will fit securely on the axle of the lawn mower or other wheeled device. For example, the wheel 30 will be a hard plastic or rubber wheel having metal or plastic aerator spikes 34 spaced around the outside edge of the wheel so that the spikes 34 protrude into the ground as the wheel turns.

FIG. 5 is an oblique view of the replacement wheel 30 showing the side closest to the lawn mower where the attachment is to be made to the lawn mower or other wheeled device. FIG. 6 is an oblique view of the replacement wheel 30 showing the side furthest from the wheeled device. The inside of the wheel 30 is hollow 38 so that it can be interchangeable with most lawn mowers allowing the screw or bolt to easily be replaced through bolt hole 36. Alternatively, the replacement wheel can be solid and not hollow. The replacement wheel is made of hard plastic or rubber with holes on the rim for the aerator spikes to be placed through and fixed into place; for example, screwed into place. Alternatively, the spikes may be non-removable and molded in one piece with the wheel. The spikes may be spiked or plugged as in the first preferred embodiment.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. An aerator attachment configured to fit over a tire, comprising:
    two or more elongated curved plastic pieces having spikes protruding outwardly from an outside surface thereof;
    a plurality of protrusions on an inside surface of each of said curved plastic pieces wherein said protrusions fit between treads of said tire so that said aerator attachment does not slip off of said wheel;
    a first strap end fixed to a first short end of a first curved plastic piece and a second strap end fixed to a second short end of a last curved plastic piece;
    a linking mechanism joining each second short end of a curved plastic piece to a first short end of a next curved plastic piece not already fixed to said first or second strap end wherein when said first strap end is fastened to said second strap end by an adjustable clasp, said two or more curved plastic pieces form a circular shape and wherein each said linking mechanism is configured to be adjusted to conform to a circumference of said tire wherein an inside surface of said circular shape is held onto said treads of said tire, wherein said two or more curved plastic pieces substantially cover said circumference of said wheel, and wherein said spikes are spiked to aerate a lawn by poking holes into said lawn as said wheel is moved over said lawn.

2. The aerator attachment of claim 1 wherein said linking mechanism comprises chain links wherein links are configured to be added or removed to increase or decrease, respectively, a diameter of said circular shape.

3. The aerator attachment of claim 1 wherein said linking mechanism comprises hinges.

4. The aerator attachment according to claim 1 wherein each of said curved plastic pieces is ⅛ to ½ inch thick.

5. The aerator attachment according to claim 1 wherein there are three curved plastic pieces substantially covering a whole of said circumference of said tire.

6. The aerator attachment according to claim 1 further comprising a guard attachment configured to attach to an axle of a wheel onto which said tire is attached to cover an upper portion of said tire to prevent injury from said spikes.

7. The aerator attachment according to claim 1 wherein said spikes are metal or plastic.

8. The aerator attachment according to claim 7 wherein said spikes are removable or non-removable from said curved plastic pieces.

9. The aerator attachment according to claim 1 wherein said aerator attachment is configured to be attached to any of an automatic push mower, manual push mower, riding lawn mower, push fertilizer, four-wheeler, lawn tractor, remote controlled lawn mower, and any other device having wheels and tires.

10. An aerator attachment configured to fit over a tire, comprising:
   an elongated flexible plastic piece having spikes protruding outwardly from an outside surface thereof; and
   a first strap end fixed to a first short end of said flexible plastic piece and a second strap end fixed to a second short end of said flexible plastic piece wherein when said first strap end is fastened to said second strap end by an adjustable clasp, said flexible plastic piece forms a circular shape conformed to a circumference of said tire wherein an inside surface of said circular shape is held onto all treads of said tire, wherein said flexible plastic piece substantially covers said circumference of said tire, and wherein said spikes are spiked to aerate a lawn by poking holes into said lawn as said wheel is moved over said lawn.

11. The aerator attachment of claim 10 further comprising a plurality of protrusions on said inside surface of said flexible plastic piece wherein said protrusions fit between said treads of said tire so that said aerator attachment does not slip off of said tire.

12. The aerator attachment according to claim 10 wherein said flexible plastic piece is ⅛ to ½ inch thick.

13. The aerator attachment according to claim 10 further comprising a guard attachment configured to attach to an axle of a wheel onto which said tire is attached to cover an upper portion of said tire to prevent injury from said spikes.

14. The aerator attachment according to claim 10 wherein said spikes are metal or plastic.

15. The aerator attachment according to claim 14 wherein said spikes are removable or non-removable from said flexible plastic piece.

16. The aerator attachment according to claim 10 wherein said aerator attachment is configured to be attached to any of an automatic push mower, manual push mower, riding lawn mower, push fertilizer, four-wheeler, lawn tractor, remote controlled lawn mower, and any other device having wheels and tires.

17. An aerator attachment configured to fit over a tire, comprising:
   two or more elongated curved plastic pieces having spikes protruding outwardly from an outside surface thereof;
   a first strap end fixed to a first short end of a first curved plastic piece and a second strap end fixed to a second short end of a last curved plastic piece;
   a linking mechanism joining each second short end of a curved plastic piece to a first short end of a next curved plastic piece not already fixed to said first or second strap end wherein when said first strap end is fastened to said second strap end by an adjustable clasp, said two or more curved plastic pieces form a circular shape and wherein each said linking mechanism is configured to be adjusted to conform to a circumference of said tire wherein an inside surface of said circular shape is held onto said treads of said tire, wherein said two or more curved plastic pieces substantially cover said circumference of said tire, and wherein said spikes are configured to aerate a lawn by removing a plug of ground from said lawn as said tire is moved over said lawn.

18. The aerator attachment of claim 17 further comprising a plurality of protrusions on said inside surface of each of said curved pieces wherein said protrusions fit between treads of said wheel so that said aerator attachment does not slip off of said wheel.

19. The aerator attachment of claim 17 wherein said linking mechanism comprises chain links wherein links are configured to be added or removed to increase or decrease, respectively, a diameter of said circular shape.

20. The aerator attachment of claim 17 wherein said linking mechanism comprises hinges.

\* \* \* \* \*